US012634795B2

(12) United States Patent
Fang et al.

(10) Patent No.: US 12,634,795 B2
(45) Date of Patent: May 19, 2026

(54) SERVICE-BASED TRANSMISSION PATH MEASUREMENT FOR MULTI-LINK ENHANCED SERVICE SET NETWORKS

(71) Applicant: MediaTek Inc., Hsinchu City (TW)

(72) Inventors: Yonggang Fang, San Jose, CA (US); James Chih-Shi Yee, San Jose, CA (US); Gabor Bajko, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/129,070

(22) Filed: Mar. 31, 2023

(65) Prior Publication Data

US 2023/0328623 A1 Oct. 12, 2023

Related U.S. Application Data

(60) Provisional application No. 63/328,767, filed on Apr. 8, 2022.

(51) Int. Cl.
| | |
|---|---|
| *H04W 4/00* | (2018.01) |
| *H04W 24/10* | (2009.01) |
| *H04W 40/12* | (2009.01) |

(52) U.S. Cl.
CPC ........... *H04W 40/12* (2013.01); *H04W 24/10* (2013.01)

(58) Field of Classification Search
CPC .............................. H04W 24/10; H04W 40/12
See application file for complete search history.

(56) References Cited

U.S. PATENT DOCUMENTS

| | | | | |
|---|---|---|---|---|
| 10,045,276 B2 * | 8/2018 | Chou | .................... | H04L 45/121 |
| 10,219,310 B2 * | 2/2019 | Kanugovi | ......... | H04W 28/0247 |
| 2003/0097470 A1 * | 5/2003 | Lapuh | .................... | H04L 69/18 |
| | | | | 709/239 |
| 2006/0218271 A1 * | 9/2006 | Kasslin | ................ | H04L 1/0026 |
| | | | | 709/224 |
| 2009/0011768 A1 * | 1/2009 | Seok | .................... | H04W 24/08 |
| | | | | 455/450 |

(Continued)

FOREIGN PATENT DOCUMENTS

| | | | | |
|---|---|---|---|---|
| CA | 3205935 A1 * | 8/2022 | ............ | H04W 24/10 |
| WO | WO-2021183045 A1 * | 9/2021 | ............ | H04W 76/14 |
| WO | WO-2022166668 A1 * | 8/2022 | ............ | H04W 24/10 |

OTHER PUBLICATIONS

European Patent Office, Extended European Search Report in European Patent Application No. 23166275.0, Jul. 21, 2023.

(Continued)

*Primary Examiner* — Elisabeth Benoit Magloire
(74) *Attorney, Agent, or Firm* — Andy M. Han; Han IP PLLC

(57) ABSTRACT

Techniques pertaining to service-based transmission path measurement for multi-link (ML) enhanced service set (ESS) networks in wireless communications are described. A non-access point (non-AP) multi-link device (MLD) transmits an ML measurement request message and receives an ML measurement response message. The ML measurement response message indicates quality of service (QoS) measurement information on one or more links within each of one or more transmission paths of a plurality of transmission paths from an associated non-AP MLD in an ML ESS network with a single-point association.

19 Claims, 12 Drawing Sheets

200 ⟍

(56) References Cited

U.S. PATENT DOCUMENTS

| | | | |
|---|---|---|---|
| 2010/0284413 A1* | 11/2010 | Abdullah | H04L 12/462 |
| | | | 370/401 |
| 2016/0174107 A1* | 6/2016 | Kanugovi | H04W 28/12 |
| | | | 370/236 |
| 2018/0183723 A1* | 6/2018 | Cariou | H04L 69/22 |
| 2020/0221545 A1 | 7/2020 | Stacey et al. | |
| 2021/0075697 A1* | 3/2021 | Dattagupta | H04L 41/0895 |
| 2021/0218686 A1* | 7/2021 | Galeev | H04L 43/08 |
| 2022/0070791 A1 | 3/2022 | Kim et al. | |
| 2022/0225253 A1* | 7/2022 | Galeev | H04L 1/0026 |
| 2023/0156840 A1* | 5/2023 | Chitrakar | H04W 76/15 |
| | | | 370/329 |
| 2023/0199641 A1* | 6/2023 | Naik | H04W 76/15 |
| | | | 370/318 |
| 2023/0217492 A1* | 7/2023 | Garcia Rodriguez | |
| | | | H04W 74/0816 |
| | | | 370/329 |
| 2024/0015544 A1* | 1/2024 | Sedin | H04W 24/08 |
| 2024/0324040 A1* | 9/2024 | Ambede | H04B 17/346 |

OTHER PUBLICATIONS

Rojan Chitrakar (Panasonic): "Multi-link Setup clarifications", IEEE Draft; 11-20-0751-01-00BE-Multi-Link-Setup-Clarifications, IEEE-SA Mentor, Piscataway, NJ USA, vol. 802.11 EHT; 802.11be, No. 1, Jul. 21, 2020, pp. 1-18, XP068170148.

* cited by examiner

200

Application
Server 2

Application
Server 1

ML ESS
Manager/GW

AP-MLD-1

AP-MLD-2

Path 1

Path 2

Non-AP-MLD

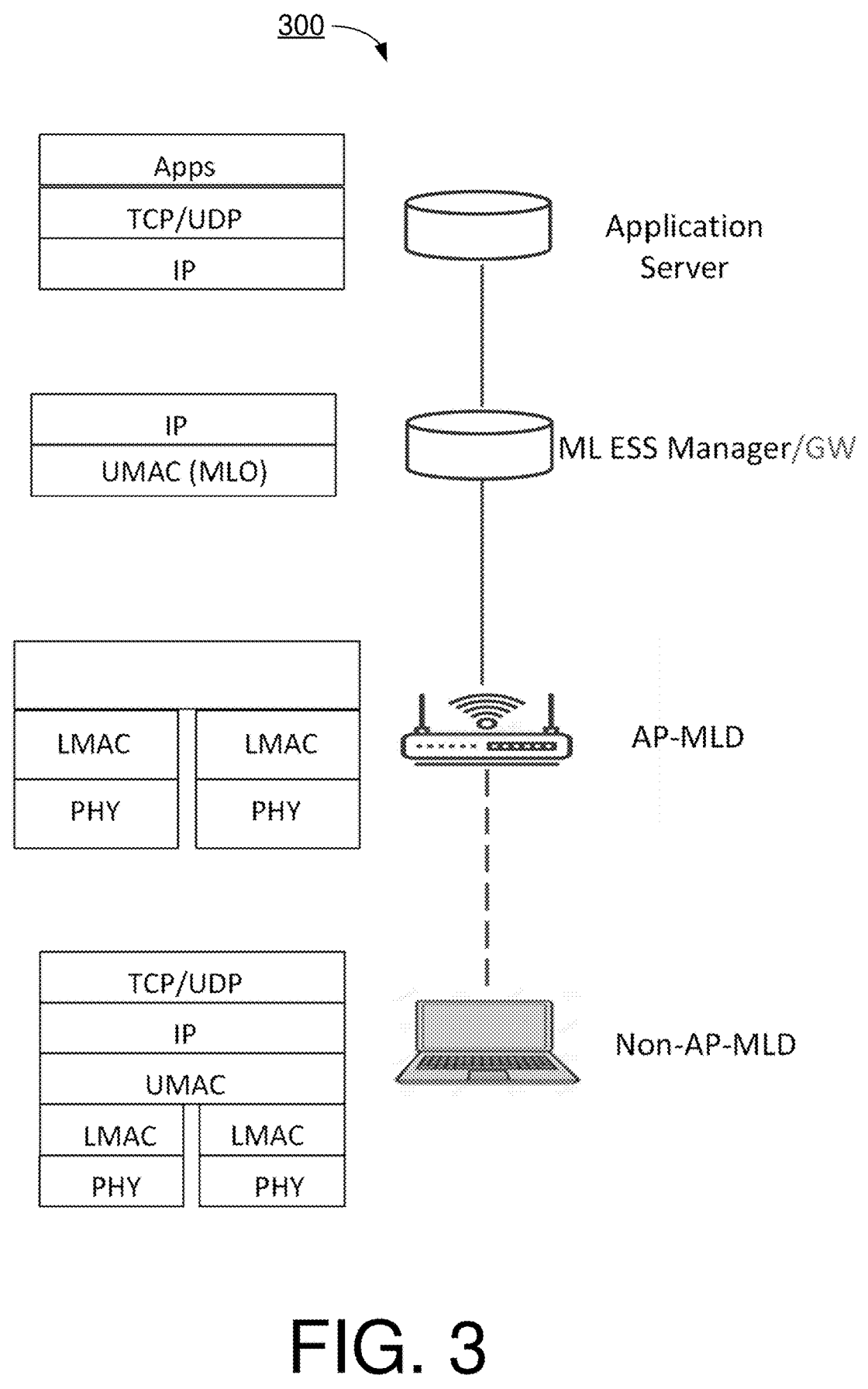

300

| Apps |
| TCP/UDP |
| IP |

Application
Server

| IP |
| UMAC (MLO) |

ML ESS Manager/GW

| | |
| LMAC | LMAC |
| PHY | PHY |

AP-MLD

| TCP/UDP |
| IP |
| UMAC |
| LMAC | LMAC |
| PHY | PHY |

Non-AP-MLD

FIG. 3

**Duplicate transmissions for high reliable traffic
in a single point association ML ESS network**

**Load balancing between multi-paths
In a single point association ML ESS network**

Figure 11:
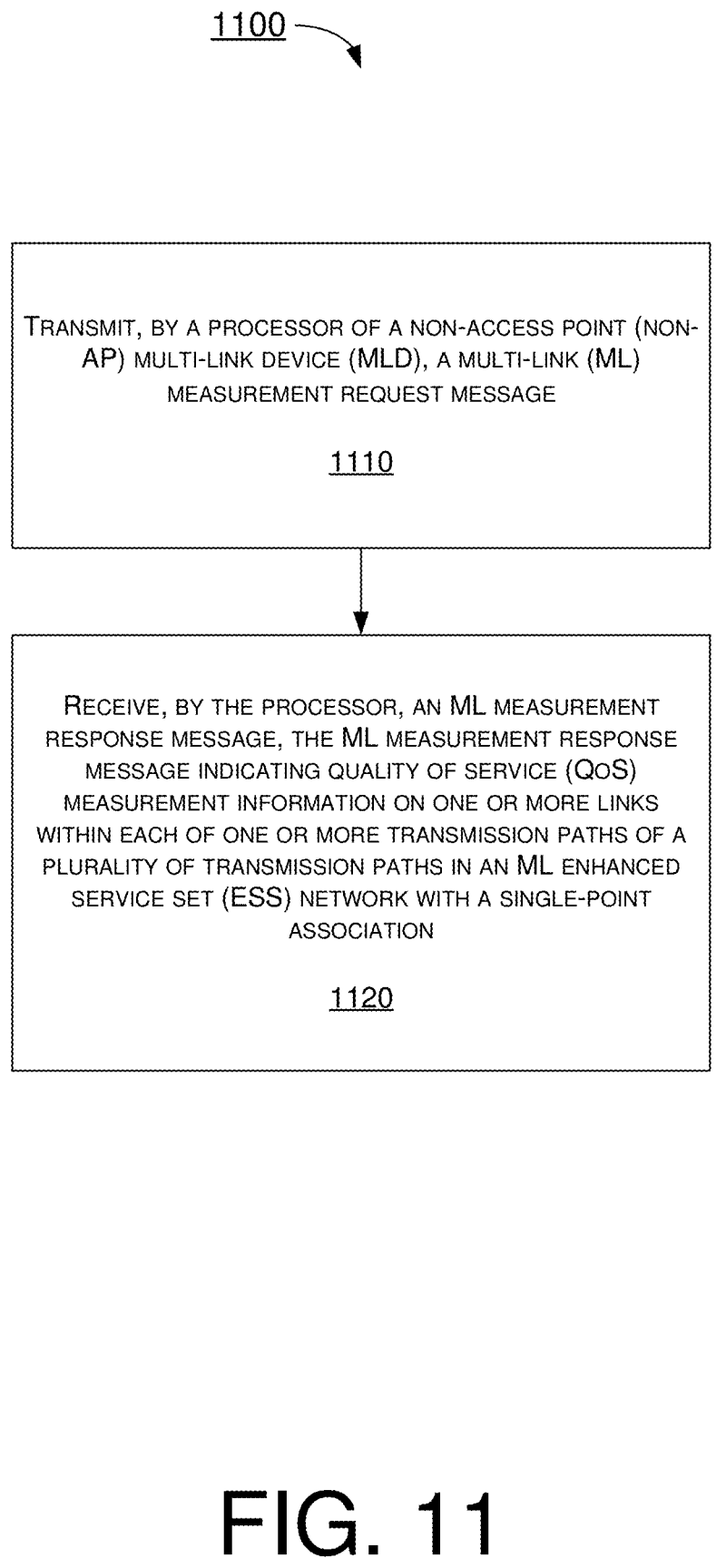

1100

TRANSMIT, BY A PROCESSOR OF A NON-ACCESS POINT (NON-AP) MULTI-LINK DEVICE (MLD), A MULTI-LINK (ML) MEASUREMENT REQUEST MESSAGE

1110

RECEIVE, BY THE PROCESSOR, AN ML MEASUREMENT RESPONSE MESSAGE, THE ML MEASUREMENT RESPONSE MESSAGE INDICATING QUALITY OF SERVICE (QoS) MEASUREMENT INFORMATION ON ONE OR MORE LINKS WITHIN EACH OF ONE OR MORE TRANSMISSION PATHS OF A PLURALITY OF TRANSMISSION PATHS IN AN ML ENHANCED SERVICE SET (ESS) NETWORK WITH A SINGLE-POINT ASSOCIATION

Figure 12:
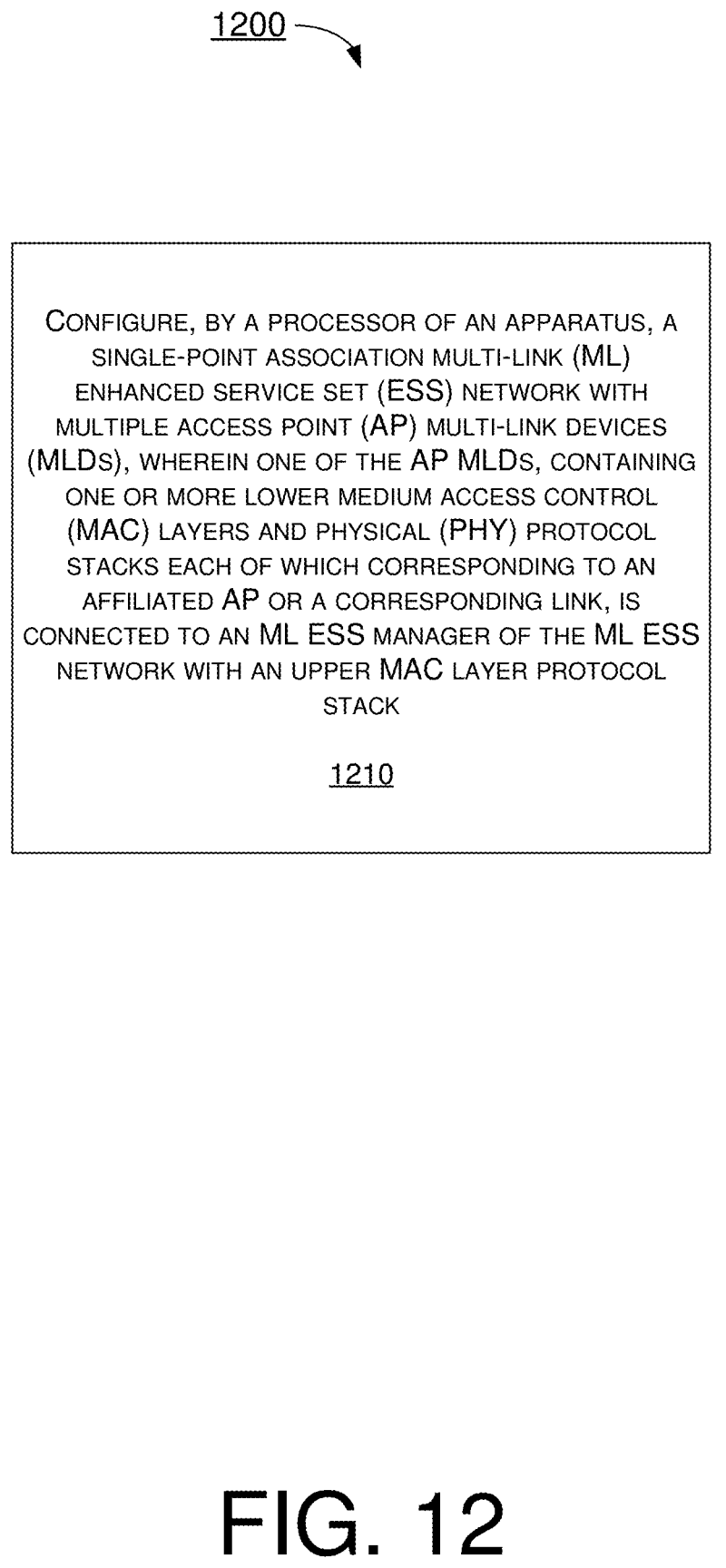

CONFIGURE, BY A PROCESSOR OF AN APPARATUS, A SINGLE-POINT ASSOCIATION MULTI-LINK (ML) ENHANCED SERVICE SET (ESS) NETWORK WITH MULTIPLE ACCESS POINT (AP) MULTI-LINK DEVICES (MLDS), WHEREIN ONE OF THE AP MLDS, CONTAINING ONE OR MORE LOWER MEDIUM ACCESS CONTROL (MAC) LAYERS AND PHYSICAL (PHY) PROTOCOL STACKS EACH OF WHICH CORRESPONDING TO AN AFFILIATED AP OR A CORRESPONDING LINK, IS CONNECTED TO AN ML ESS MANAGER OF THE ML ESS NETWORK WITH AN UPPER MAC LAYER PROTOCOL STACK

SERVICE-BASED TRANSMISSION PATH MEASUREMENT FOR MULTI-LINK ENHANCED SERVICE SET NETWORKS

CROSS REFERENCE TO RELATED PATENT APPLICATION(S)

The present disclosure is part of a non-provisional patent application claiming the priority benefit of U.S. Provisional Patent Application No. 63/328,767, filed 8 Apr. 2022, the content of which herein being incorporated by reference in its entirety.

TECHNICAL FIELD

The present disclosure is generally related to wireless communications and, more particularly, to service-based transmission path measurement for multi-link (ML) enhanced service set (ESS) networks in wireless communications.

BACKGROUND

Unless otherwise indicated herein, approaches described in this section are not prior art to the claims listed below and are not admitted as prior art by inclusion in this section.

In wireless communications, such as Wi-Fi based on one or more Institute of Electrical and Electronics Engineers (IEEE) 802.11 standards, a communication path typically consists of one or more links in parallel or cascade between multiple network entities depending on the network topology. A single communication link between a station (STA) and an access point (AP) has a limited transmission reliability, especially for time-sensitive traffic. In case that the communication link is interfered or overloaded, user data cannot be transmitted on that single link. Existing Wi-Fi system architecture typically allows a STA or STA multi-link device (MLD) to associated with an AP or AP MLD. When the wireless communication link is congested, the traffic is either blocked or a STA/STA MLD needs to take a few hundreds of milliseconds to switch to another AP or AP MLD to continue its communication. Thus, it would be beneficial to define a mechanism to acquire transmission quality of service (QoS) measurement information along transmission paths in a single-point association ML ESS network so as to allow different mechanisms to improve transmission reliability. Therefore, a solution of QoS service-based transmission path measurement for wireless communications in ML ESS networks is needed.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to service-based transmission path measurement for wireless communications in a single-point association ML ESS network. It is believed that, under various proposed schemes in accordance with the present disclosure, real-time QoS measurement information may be used to determine the transmission path(s) for time-sensitive traffic with constraint on reliability requirement, thereby improving wireless transmission reliability especially for time-sensitive traffic in a high-interference environment.

In one aspect, a method may involve a processor of a non-AP MLD transmitting an ML measurement request message. The method also involves the processor receiving an ML measurement response message. The ML measurement response message may indicate QoS measurement information on one or more links within each of one or more transmission paths of a plurality of transmission paths in an ML ESS network with a single-point association.

In another aspect, an apparatus implementable in a non-AP MLD may include a transceiver and a processor coupled to the transceiver. The transceiver may be configured to communicate wirelessly. The processor may be configured to transmit an ML measurement request message and receive an ML measurement response message through the transceiver. The ML measurement response message may indicate QoS measurement information on one or more links within each of one or more transmission paths of a plurality of transmission paths in an ML ESS network with a single-point association.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of another example network architecture with protocol stacks on each network entity in accordance with the present disclosure.

FIG. 11 is a flowchart of an example process in accordance with an implementation of the present disclosure.

FIG. 12 is a flowchart of an example process in accordance with an implementation of the present disclosure

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to service-based transmission path measurement for ML ESS networks in wireless communications. According to the present disclosure, a number of possible solutions may be implemented separately or jointly. That is, although these possible solutions may be described below separately, two or more of these possible solutions may be implemented in one combination or another.

Figure 1:
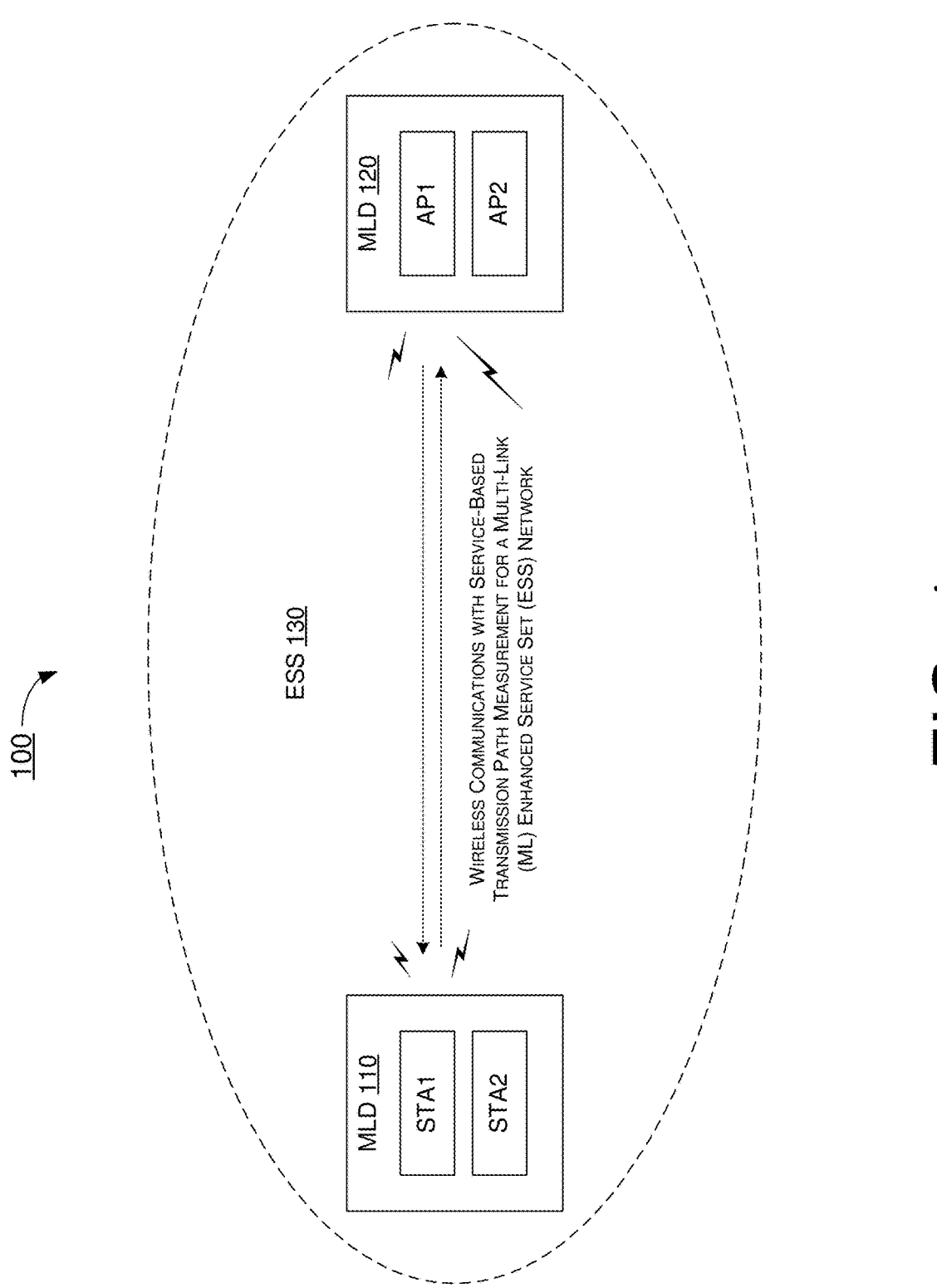
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 12 illustrate examples of implementation of various proposed schemes in network environment 100 in accordance with the present disclosure. The following description of various proposed schemes is provided with reference to FIG. 1~FIG. 12.

Referring to FIG. 1, network environment 100 may involve at least an MLD 110 and an MLD 120 communicating wirelessly with each other in an enhanced service set (ESS) 130 in accordance with one or more IEEE 802.11 standards (e.g., IEEE 802.11be and beyond). Each STA of multiple STAs (denoted as "STA1" and "STA2" in FIG. 1) affiliated with MLD 110 may function as a non-AP STA, and each STA of multiple STAs (denoted as "AP1" and "AP2" in FIG. 1) affiliated with MLD 120 may function as an AP STA. In some cases, MLD 110 may be a non-simultaneous-transmission-and-reception (NSTR) non-AP MLD and MLD 120 may be an NSTR AP MLD operating on an NSTR link pair. In some cases, MLD 110 may be an enhanced multi-link single-radio (EMLSR) non-AP MLD and MLD 120 may be a simultaneous-transmission-and-reception (STR) AP MLD operating on an EMLSR link pair. In some cases, MLD 110 may be an enhanced multi-link multi-radio (EMLMR) MLD non-AP MLD and MLD 120 may be a STR AP MLD operating on an EMLMR link pair. In other cases, MLD 110 may be a STR non-AP MLD and MLD 120 may be a STR AP MLD operating on a STR link pair. Moreover, one or each of MLD 110 and MLD 120 may be configured to utilize service-based transmission path measurement for ML ESS networks in wireless communications in accordance with various proposed schemes, as described below. It is noteworthy that, while the various proposed schemes may be individually or separately described below, in actual implementations each of the proposed schemes may be utilized individually or separately. Alternatively, some or all of the proposed schemes may be utilized jointly.

Figure 2:
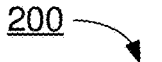
FIG. 2 is a diagram of an example network architecture in accordance with the present disclosure.

FIG. 2 illustrates an example network architecture 200 of an enhanced ML ESS network with single-point association in accordance with the present disclosure. Referring to FIG. 2, an ML ESS network may include one or more AP MLDs. Each AP MLD attached to the ML ESS network may contain one or more affiliated APs and communicate with other AP MLD(s) attached to the same ML ESS network over a backhaul connection, which may be either wired or wireless. Each AP MLD attached to the ML ESS network may provide an access service to one or more associated non-AP MLDs. Moreover, an AP affiliated with an AP MLD may be considered as a distributed AP in the ML ESS network, and the AP may be configured to support: (i) one basic service set identifier (BSSID) which identifies a basic service set (BSS); or (ii) multiple BSSIDs, each of which identifies a virtual BSS. A reporting BSS or virtual BSS may be assigned to a corresponding service set identifier (SSID). All BSS's or virtual BSS's with the same SSID, interconnected in the same distribution system (DS), may form an ESS. Multiple ESS's may constitute an ML ESS network with multiple difference access networks.

Figure 8:
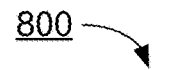
FIG. 8 is a diagram of an example transmission scenario in accordance with the present disclosure.
Figure 8:
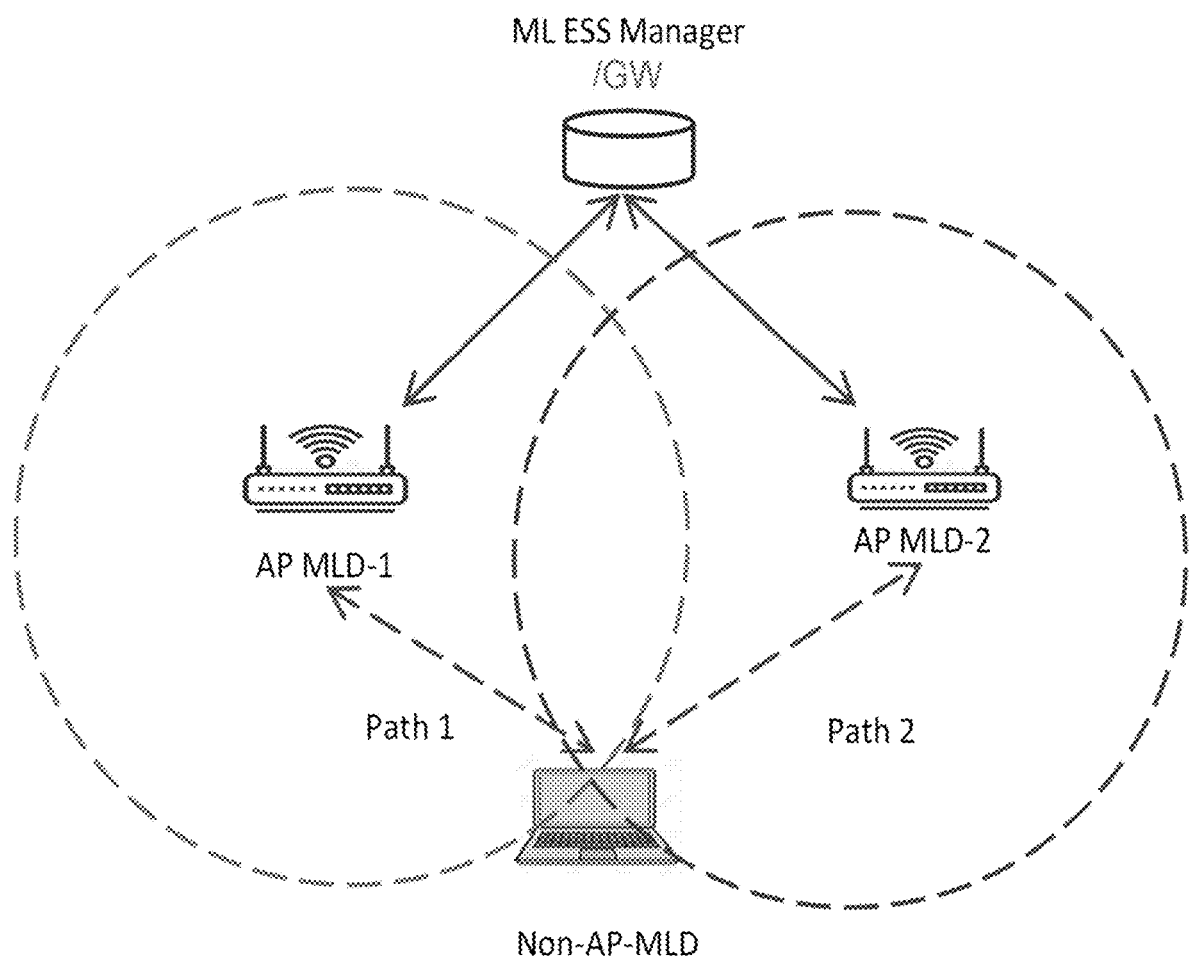

In the single-point association ML ESS network shown in FIG. 2, a network functional entity may be assigned as the ML ESS Manager (which may also function as a gateway, denoted as "GW" in some of the figures including FIG. 2, FIG. 3 and FIG. 8) to perform certain operations, such as: (i) coordination of the operation of AP MLDs attached to the ML ESS network; (ii) processing authentication and association requests from non-AP MLDs; and (iii) transmission of a medium access control (MAC) Service Data Unit (MSDU) over a selected path or over multiple paths to a non-AP MLD or reception of MSDUs sent from AP MLDs attached to the ML ESS network. Moreover, each non-AP MLD may perform certain operations, such as: (i) association with the ML ESS Manager/Gateway through an AP affiliated with an AP MLD; (ii) querying measurement reports on paths/links of AP MLDs attached to the ML ESS network; and (iii) transmission of a MSDU over a selected path or duplicated MSDUs over multiple paths to the ML ESS Manager/Gateway. The network functional entity operating as the ML ESS Manager/Gateway may be located as an individual network entity or located within an AP MLD in the ML ESS network.

FIG. 3 illustrates another example network architecture 300 of an enhanced ML ESS network with single-point association in accordance with the present disclosure. Referring to FIG. 3, with respect to configuration of an ML ESS network, an ML ESS Manager/Gateway may be configured to be collocated with an ML ESS gateway and may communicate with application servers over data network or Internet. The ML ESS Manager/Gateway may orchestrate and coordinate operations of AP MLDs attached to the ML ESS network.

In the ML ESS network, an AP MLD may be considered as a distributed Layer-2 (L2) relay node. An Upper-Layer MAC (UMAC) protocol stack of the AP MLD may be located at the ML ESS Manager/Gateway. An ML Operation (MLO) function at ML ESS Manager/Gateway entity may handle the management of messages and user traffic through the AP MLD attached to the ML ESS network. A Lower-Layer MAC (LMAC) protocol stack of the AP MLD may be located at each AP affiliated with the AP MLD, which may handle the management of messages and user traffic to/from STA(s) affiliated with each non-AP MLD. Moreover, an AP MLD may have a backhaul link attached to the ML ESS network (either wired or wireless), which may have different delay to the ML ESS network from other attached AP MLDs. Furthermore, the MLD MAC address of each affiliated AP may be set to the MAC address of the ML ESS Manager/Gateway, and a non-AP MLD may know the MAC address of the ML ESS Manager/Gateway from the MLD MAC address in the ML element of ML messages from an AP affiliated with the AP MLD attached to the ML ESS network.

Figure 4:
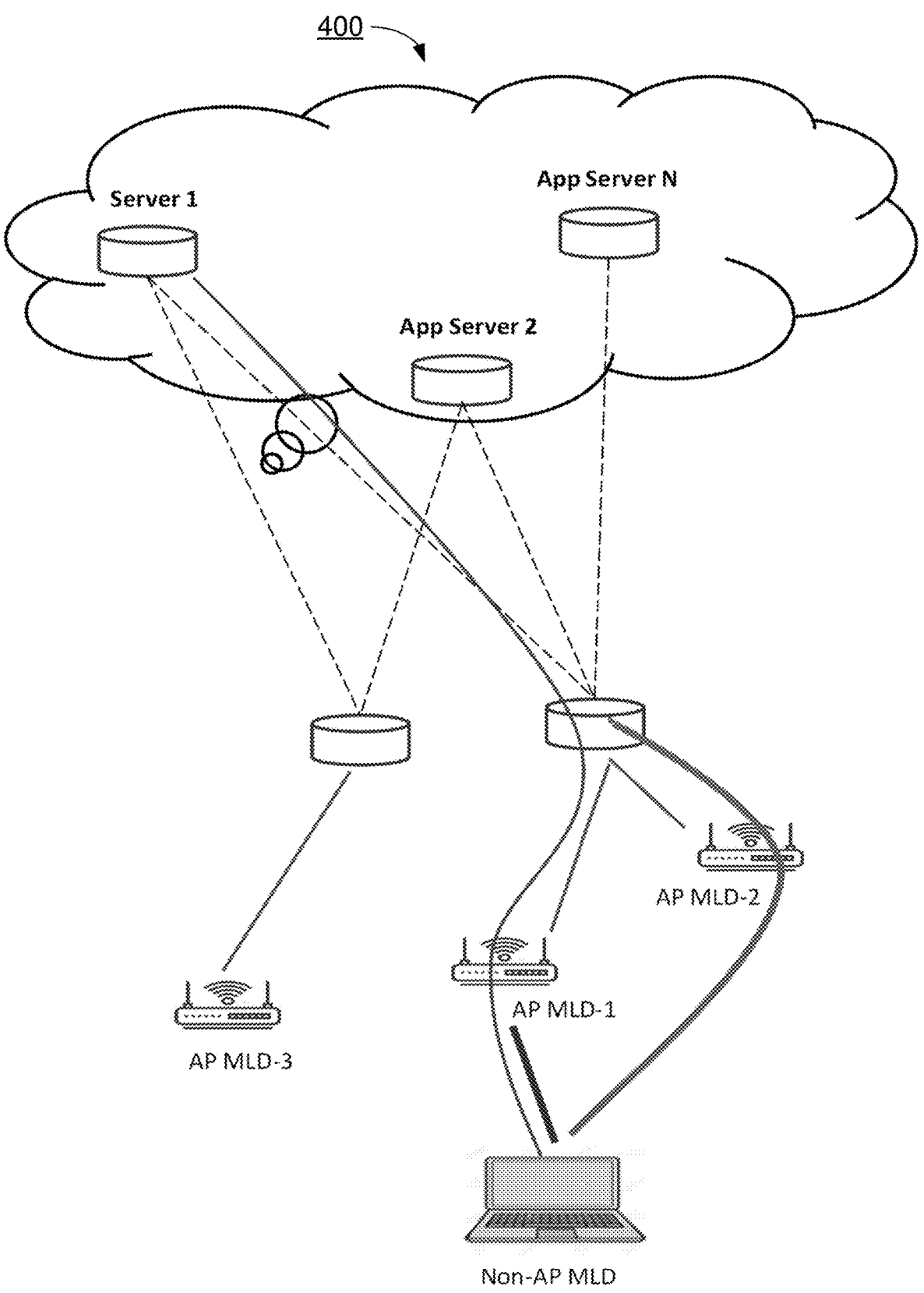
FIG. 4 is a diagram of an example network deployment scenario with multi-link devices in accordance with the present disclosure.

FIG. 4 illustrates an example network deployment scenario 400 of service based transmission path measurement in an enhanced ML ESS network with single-point association in accordance with the present disclosure. The Service-Based Transmit Stream/Category Measurement Report is enhanced from the Transmit Stream/Category Measurement Report for the QoS measurement on a single link between a STA and an AP per traffic identifier (TID). The information in the Measurement Report may include information such as, for example: transmitted MSDU count, MSDU discarded count, MSDU failed count, average queue delay, and average transmit delay. Moreover, with respect to service-based transmission path measurement, a Service-Based Transmit Stream/Category Measurement Report provides the transmission QoS performance measurement of a path between a non-AP MLD and the ML ESS Manager/Gateway (e.g., at the Link Layer). This Measurement Report may specify the QoS measurement performed on a link of the AP MLD, or specify the QoS measurement performed on a path to the ML ESS Manager/Gateway (e.g., including backhaul of an AP MLD).

Under a proposed scheme in accordance with the present disclosure, a Service-Based Transmission Path Measurement Report regarding a service-based transmission path measurement may indicate a Service ID. The Service ID may be used to identify a given service. For example, Internet Protocol (IP)-based services may use an IP port to identify the service and/or protocol. Differentiated Service Code Point (DSCP) may be utilized for classifying and managing network traffic and providing QoS over IP network. Under the proposed scheme, the service may be identified by Service ID Type and Service ID. The Service ID Type may indicate, for example: TID/User Priority (UP) (e.g., set to 0 as default type), DSCP (e.g., set to 1), IP port (e.g., set to 2), and Stream Classification Service ID (SC-SID) (e.g., set to 3). The Service ID may be set to the value of TID/UP, DSCP, IP port or SCSID according to the Service ID Type. It is noteworthy that the TID/UP or DSCP may be used to identify the streams with the same QoS characteristics, while the SCSID may be used to identify a specific stream being carried over multi-link or multi-path in the ML ESS network. Moreover, the Service ID may be used to identify the QoS characteristics of a single stream and/or the QoS characteristics of different streams. In the latter case, each affiliated AP and the ML ESS Manager/Gateway may combine statistics data among different streams with the same Service ID.

Figure 5:
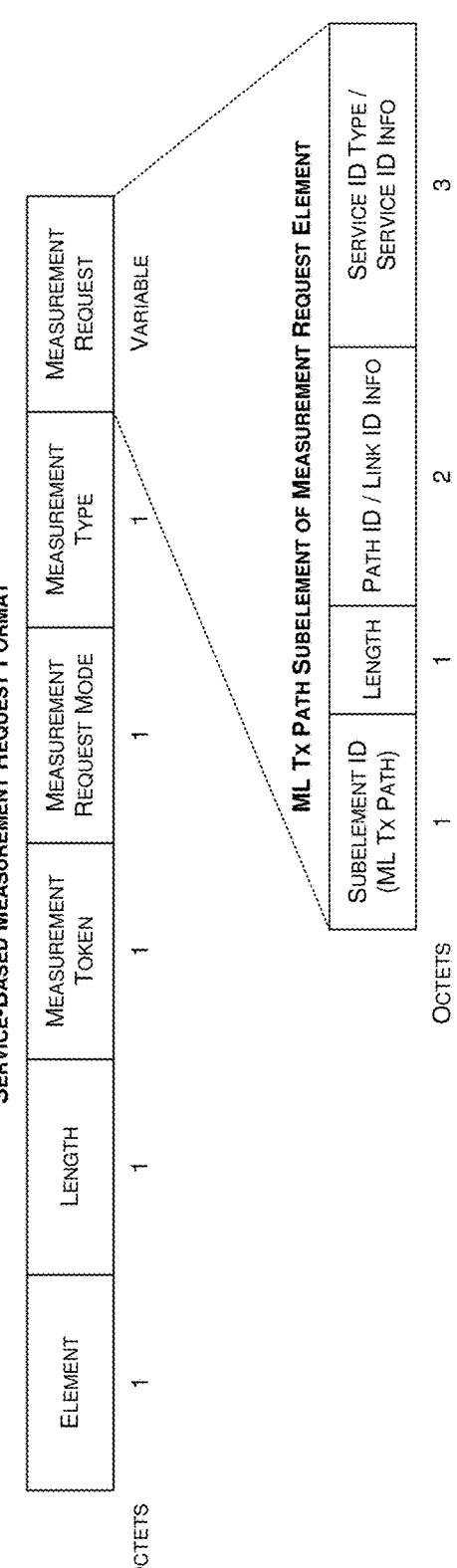
FIG. 5 is a diagram of an example message design in accordance with the present disclosure.

FIG. 5 illustrates an example message design 500 of a Service-Based Transmission Path Measurement Request under a proposed scheme in accordance with the present disclosure. Specifically, message design 500 shows an example of a Service-Based Measurement Request format for Transmit Stream/Category. Referring to FIG. 5, there may be a Measurement Type field and a Measurement Request field in the Service-Based Measurement Request. Under the proposed scheme, the Measurement Type field may be set to indicate Transmit Stream/Category Measurement. Moreover, the Measurement Request field may have an optional subelement ID (e.g., for ML Transmission (Tx) Path). The Measurement Request field may carry the ML Tx Path subelement which may contain one or more sets of Path ID/Link ID Information field(s) and Service ID Type/Service ID Information field(s). The Path ID/Link ID Information field(s) may be set to value(s) to identify the path and the link on which the service-based transmission performance is to be measured and reported. The Path ID may be used to identify the AP MLD affiliated with the ML ESS network. The Link ID may be used to identify the AP affiliated with the AP MLD. In case that the Path ID/Link ID is set to a special value, like 0, the Service-Based Measurement Report may include QoS performance measurement results on all links of one or more neighbor AP MLDs. In case that the Path ID/Link ID is set to a special value, like FFFF, the Service-Based Measurement Report may include QoS performance measurement results on all inks of one or more AP MLDs affiliated to the ML ESS network. The Service ID Type/Service ID Info field may be set to a value of the Service ID Type and Service ID for the Service ID Type.

Figure 6:
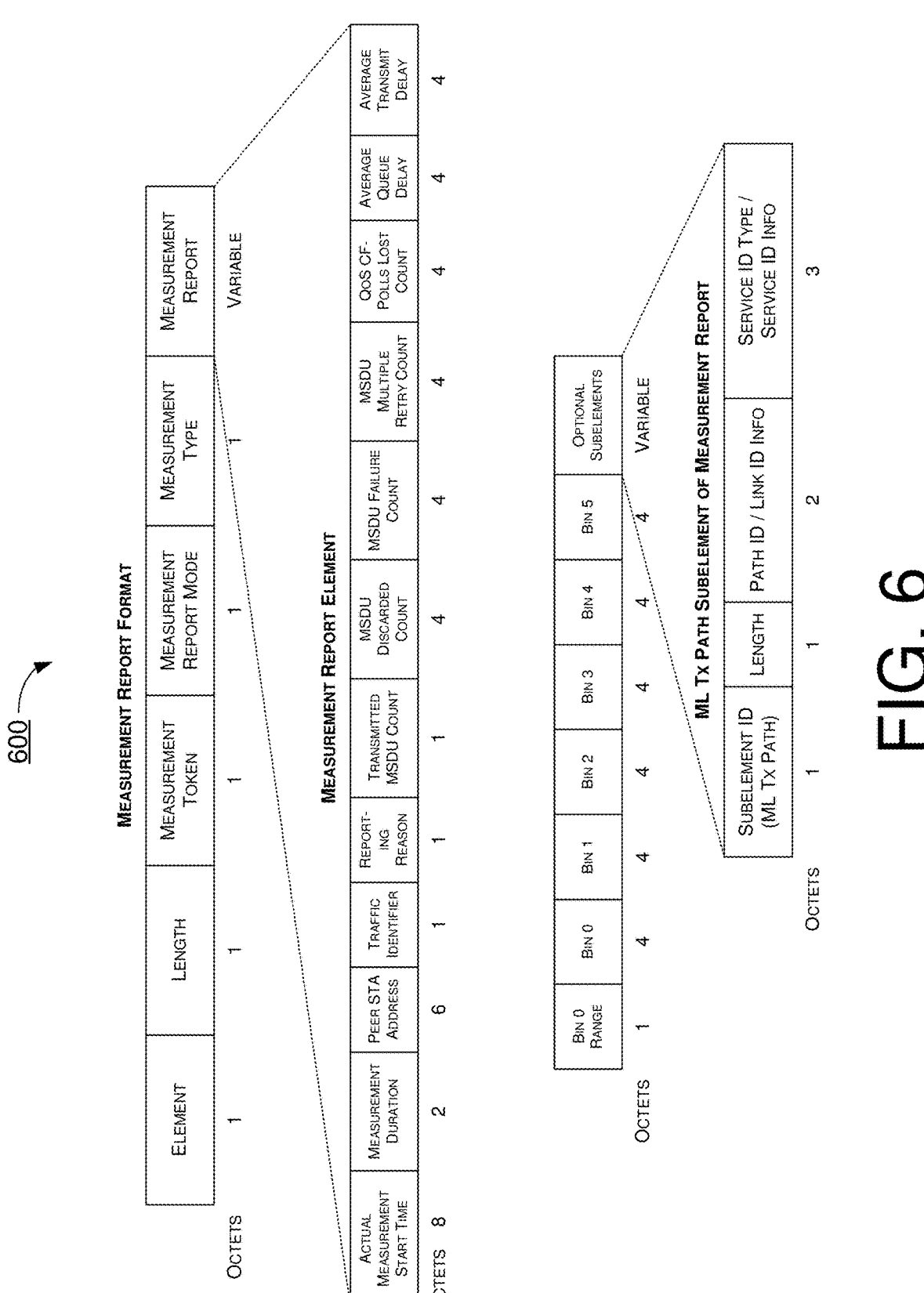
FIG. 6 is a diagram of an example message design in accordance with the present disclosure.

FIG. 6 illustrates an example message design 600 of a Service-Based Transmission Path Measurement Report under a proposed scheme in accordance with the present disclosure. Specifically, message design 600 shows an example of a Service-Based Measurement Report format for Transmit Stream/Category. Referring to FIG. 6, there may be an optional subelement (e.g., for ML Tx Path) in the Service-Based Measurement Report. The ML Tx Path subelement may contain one or more sets of Path ID/Link ID Infor field(s), Service ID Type/Service ID Info field(s) and Measured MSDU Transmit Delay Unit Factor field(s). The Path ID/Link ID Info field(s) may be set to value(s) to identify the path and the link on which the service-based transmission's QoS performance measurement is performed. The Service ID Type/ID Info field may be set to a value of Service ID Type and Service ID specified by the Service ID Type. The Measured MSDU Transmit Delay Unit Factor (F) field may be set to a value that applies to the unit of Measured MSDU Transmit Delay (e.g., =10 TU/F). For example, for F=10, the unit of Measured MSDU Transmit Delay is 1 TU. For Bin 0, Delay <1 TU.

Figure 7:
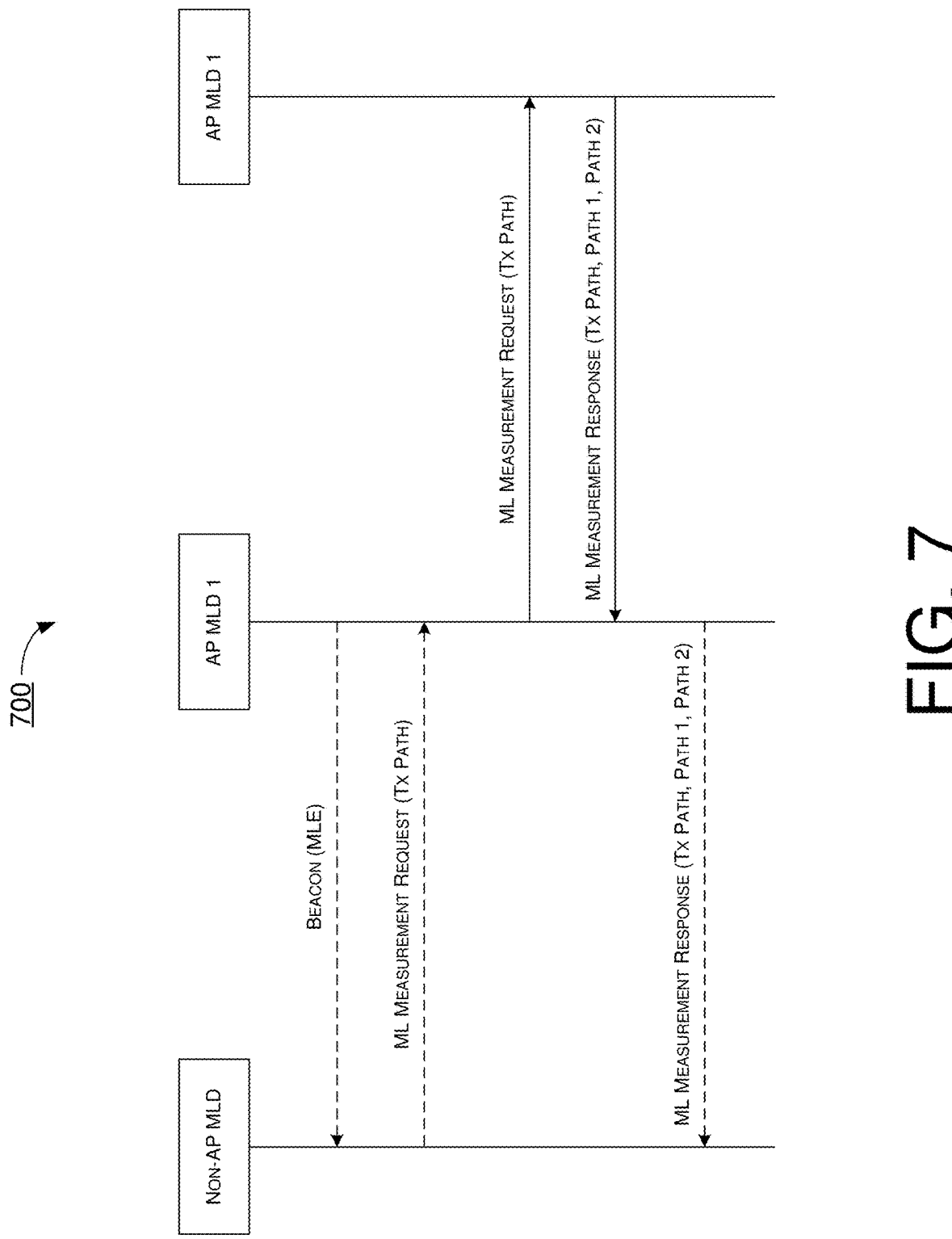
FIG. 7 is a diagram of an example signaling flow scenario in accordance with the present disclosure.

FIG. 7 illustrates an example signaling flow scenario 700 with respect to a Service-Based Transmission Path Report message flow under a proposed scheme in accordance with the present disclosure. Specifically, scenario 700 pertains to an ML Measurement Request and Response flow. Referring to FIG. 7, a non-AP MLD may send an ML Measurement Request message with an ML Tx Path subelement of a Measurement Request element including a Tx Path Information field and a Service ID Information field. The Tx Path Information may be indicated by the Path ID/Link ID subfield. When Path ID/Link ID=0, the Tx Path Info may refer to the paths over neighboring APs. When Path ID/Link ID=FFFF, the Tx Path Info may refer to all paths to the ML ESS Manager/Gateway. The Service ID Info field may contain a Service ID specified by Service ID Type, which may be: TID/UP, DSCP, ID port or SCSID. An AP affiliated with AP MLD 1 may receive this ML Measurement Request and forward it to the ML ESS Manager/Gateway. The ML ESS Manager/Gateway may process the ML Measurement Request and send the ML Measurement Response to AP MLD 1. The AP affiliated with AP MLD 1 may respond to the non-AP MLD in a ML Measurement Response with the Transmit Stream/Category Measurement Report element which carries the QoS measurement report on requested paths over the reporting AP and neighboring AP(s).

FIG. 8 illustrates an example transmission scenario 800 of a use case of improved transmission reliability for Service-Based Transmission Path Report under a proposed scheme in accordance with the present disclosure. In scenario 800, an ML ESS network may include one or more AP MLDs for extended coverage. A non-AP MLD and the ML ESS Manager or gateway (GW) may set up multiple transmission paths for a high-reliability time-sensitive traffic. AP MLDs attached to the ML ESS network may be provisioned with a QoS Profile for the high-reliability time-sensitive traffic. The non-AP MLD may receive an ML Measurement Report from an AP affiliated with an AP MLD attached to the ML ESS network, either in response to an ML Measurement Request or due to being triggered by a measured parameter value beyond a triggering threshold. Based on the QoS Profile of the traffic and the ML Measurement Report, the non-AP MLD may transmit duplicated MSDUs on multiple links/paths to meet the transmission time constraint and reliability requirement. The ML ESS Manager/GW may detect and eliminate received duplicate(s) of MSDU(s) before delivering to the upper layer protocol. In addition, to meet the transmission time constraint and reliability requirement, the ML ESS Manager/GW may autonomously transmit duplicated MSDUs to the non-AP MLD on multiple links/paths based on the QoS Profile of the traffic and the ML Measurement result(s).

Figure 9:
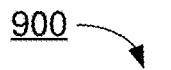
FIG. 9 is a diagram of an example transmission scenario in accordance with the present disclosure.
Figure 9:
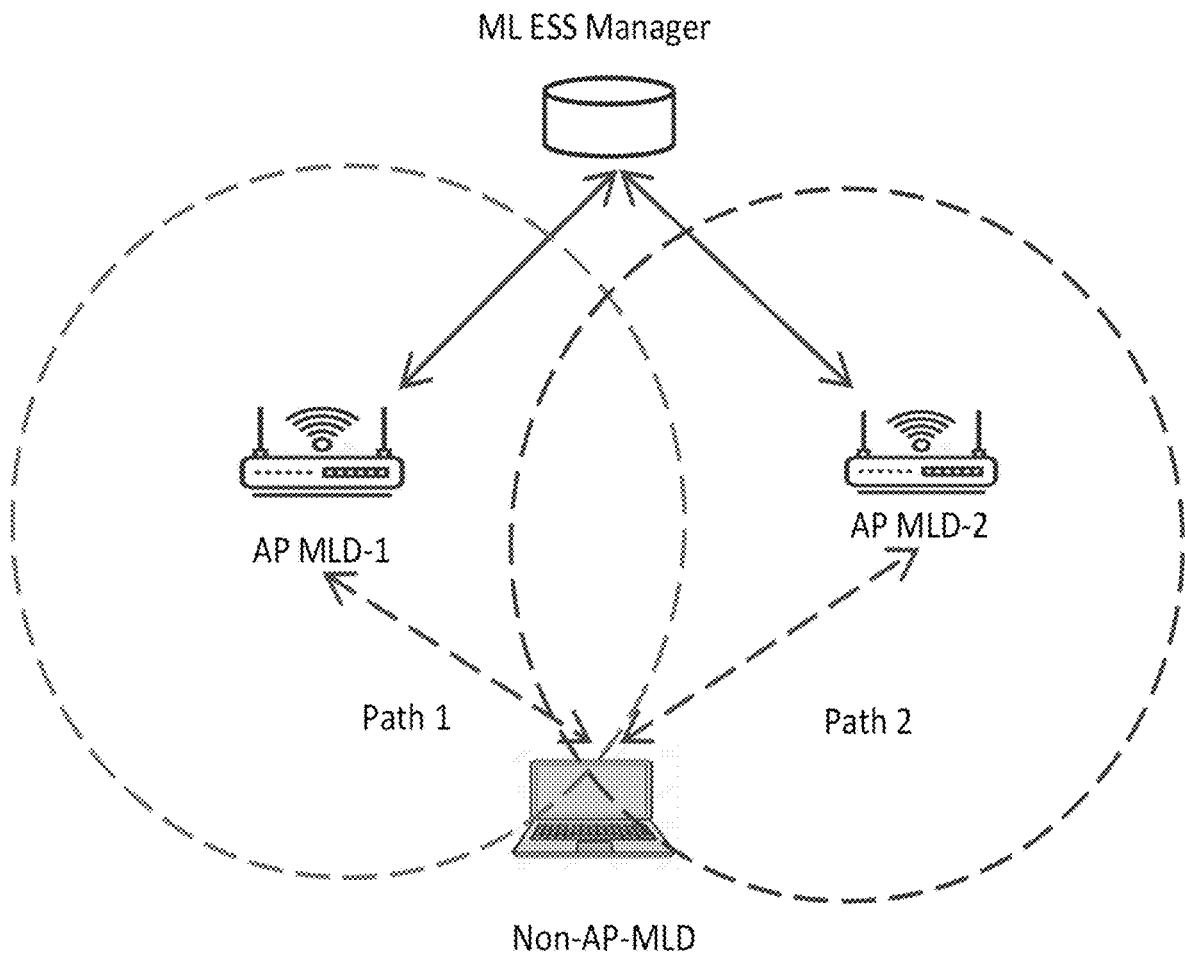

FIG. 9 illustrates an example transmission scenario 900 of a use case of load balancing between multiple paths for Service-Based Transmission Path Report under a proposed scheme in accordance with the present disclosure. In scenario 900, an ML ESS network may include one or more AP MLDs for extended coverage. A non-AP MLD and the ML ESS Manager/Gateway may set up multiple transmission paths for a high-reliability time-sensitive traffic. AP MLDs attached to the ML ESS network may be provisioned with a QoS Profile for the high-reliability time-sensitive traffic. The non-AP MLD may receive an ML Measurement Report from an AP affiliated with an AP MLD attached to the ML ESS network, either in response to an ML Measurement Request or due to being triggered by a measured parameter value beyond a triggering threshold. The non-AP MLD may select and switch a transmission path for the time-sensitive traffic based on its QoS Profile and the ML Measurement Report, and the non-AP MLD may also distribute other traffic(s) among all available paths to balance load. In addition, the ML ESS Manager/Gateway may autonomously initiate traffic load balancing based on ML Measurement result(s).

Illustrative Implementations

Figure 10:
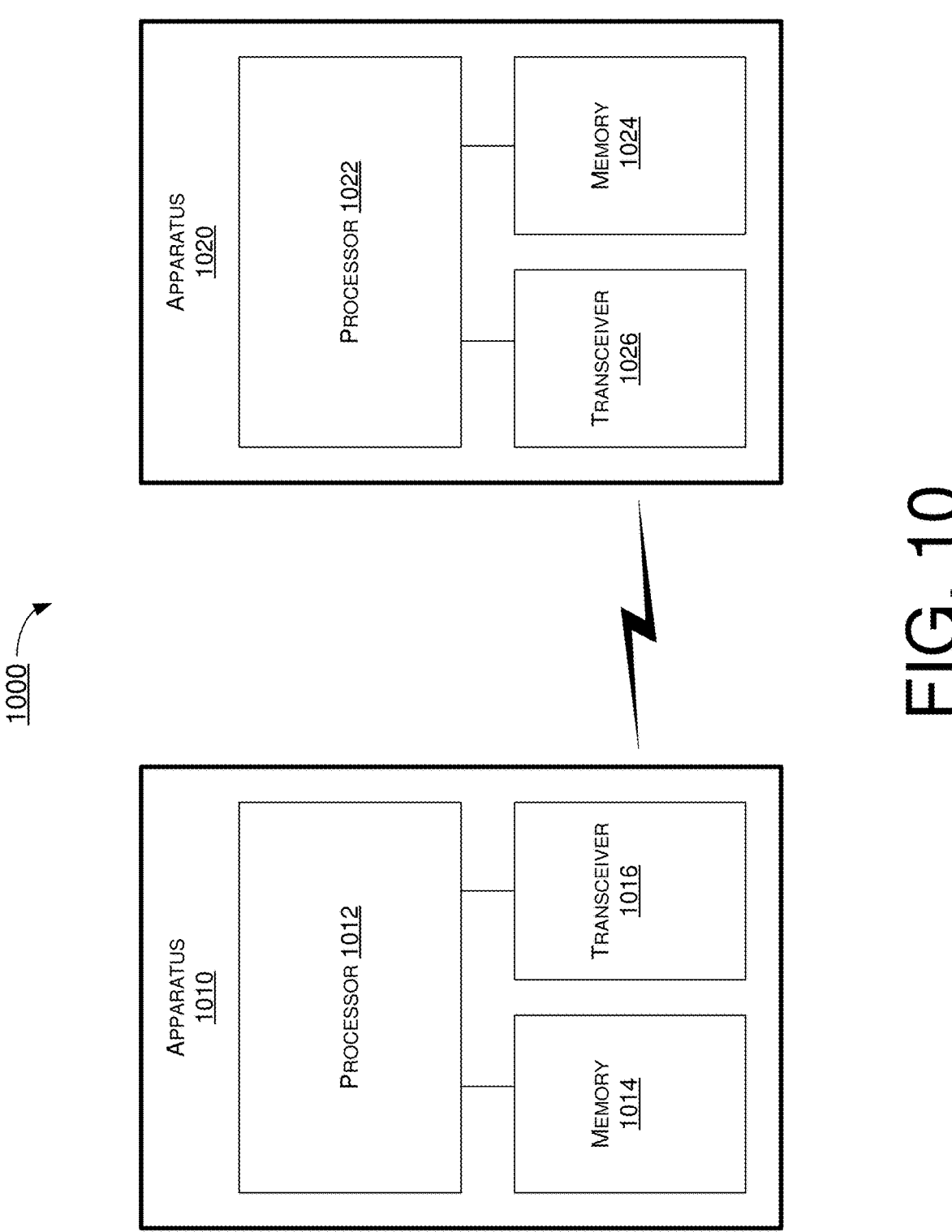
FIG. 10 is a block diagram of an example communication system in accordance with an implementation of the present disclosure.

FIG. 10 illustrates an example system 1000 having at least an example apparatus 1010 and an example apparatus 1020 in accordance with an implementation of the present disclosure. One or each of apparatus 1010 and apparatus 1020 may perform various functions to implement schemes, techniques, processes and methods described herein pertaining to service-based transmission path measurement for ML ESS networks in wireless communications, including the various schemes described above with respect to various proposed designs, concepts, schemes, systems and methods described above as well as processes described below. For instance, apparatus 1010 may be implemented in STA 110 and apparatus 1020 may be implemented in STA 120, or vice versa.

Each of apparatus 1010 and apparatus 1020 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of apparatus 1010 and apparatus 1020 may be implemented in a smartphone, a smart watch, a personal digital assistant, a digital camera, or a computing equipment such as a tablet computer, a laptop computer or a notebook computer. Each of apparatus 1010 and apparatus 1020 may also be a part of a machine type apparatus, which may be an IoT apparatus such as an immobile or a stationary apparatus, a home apparatus, a wire communication apparatus or a computing apparatus. For instance, each of apparatus 1010 and apparatus 1020 may be implemented in a smart thermostat, a smart fridge, a smart door lock, a wireless speaker or a home control center. When implemented in or as a network apparatus, apparatus 1010 and/or apparatus 1020 may be implemented in a network node, such as an AP MLD in a WLAN.

In some implementations, each of apparatus 1010 and apparatus 1020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1010 and apparatus 1020 may be implemented in or as a non-AP MLD or an AP MLD. Each of apparatus 1010 and apparatus 1020 may include at least some of those components shown in FIG. 10 such as a processor 1012 and a processor 1022, respectively, for example. Each of apparatus 1010 and apparatus 1020 may further include one or more other components not pertinent to the proposed scheme of the present disclosure (e.g., internal power supply, display device and/or user interface device), and, thus, such component(s) of apparatus 1010 and apparatus 1020 are neither shown in FIG. 10 nor described below in the interest of simplicity and brevity.

In one aspect, processor 1012 and processor 1022 may be implemented in the form of one or more single-core processors, one or more multi-core processors, one or more RISC processors or one or more CISC processors. That is, even though a singular term "a processor" is used herein to refer to processor 1012 and processor 1022, processor 1012 and processor 1022 may include multiple processors in some implementations and a single processor in other implementations in accordance with the present disclosure. In another aspect, processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 1012 and processor 1022 is a special-purpose machine specifically designed, arranged and configured to perform specific tasks including those pertaining to service-based transmission path measurement for ML ESS networks in wireless communications in accordance with various implementations of the present disclosure.

In some implementations, apparatus 1010 may also include one or more transceivers 1016 coupled to processor 1012. Each of the one or more transceivers 1016 may include a transmitter capable of wirelessly transmitting and a receiver capable of wirelessly receiving data. In some implementations, apparatus 1020 may also include one or more transceivers 1026 coupled to processor 1022. Each of the one or more transceivers 1026 may include a transmitter capable of wirelessly transmitting and a receiver capable of wirelessly receiving data. It is noteworthy that, although only one transceiver 1016/1026 is shown in FIG. 10, in some implementations, apparatus 1010 and/or apparatus 1020 may be equipped with multiple transceivers 1016 or multiple transceivers 1026. For instance, apparatus 1010 may have multiple transceiver 1016 to configure a single-point association ML ESS network with multiple AP MLDs (e.g., multiple instances of apparatus 1020 each of which functioning as or implemented in a corresponding AP MLD of the multiple AP MLDs).

In some implementations, apparatus 1010 may further include a memory 1014 coupled to processor 1012 and capable of being accessed by processor 1012 and storing data therein. In some implementations, apparatus 1020 may further include a memory 1024 coupled to processor 1022 and capable of being accessed by processor 1022 and storing data therein. Each of memory 1014 and memory 1024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1014 and memory 1024 may include a type of read-only memory (ROM) such as mask ROM, programmable ROM (PROM), erasable programmable ROM (EPROM) and/or electrically erasable programmable ROM (EEPROM). Alternatively, or additionally, each of memory 1014 and memory 1024 may include a type of non-volatile random-access memory (NVRAM) such as flash memory, solid-state memory, ferroelectric RAM (FeRAM), magnetoresistive RAM (MRAM) and/or phase-change memory.

Each of apparatus 1010 and apparatus 1020 may be a communication entity capable of communicating with each other using various proposed schemes in accordance with the present disclosure. For illustrative purposes and without limitation, a description of capabilities of apparatus 1010, as MLD 110 (e.g., a non-AP MLD), and apparatus 1020, as MLD 120 (e.g., an AP MLD), is provided below. It is noteworthy that, although the example implementations described below are provided in the context of WLAN, the same may be implemented in other types of networks. It is also noteworthy that, although examples described below are provide in the context of apparatus 1010, the examples may also be applicable to apparatus 1020 or otherwise implemented by apparatus 1020.

In one aspect pertaining to service-based transmission path measurement for ML ESS networks in wireless communications in accordance with the present disclosure, with apparatus 1010 implementing a STA affiliated with a non-AP MLD (e.g., MLD 110) and apparatus 1020 implementing an AP affiliated with an AP MLD (e.g., MLD 120), processor 1012 may, as a STA, transmit, via transceiver 1016, an ML measurement request message. Moreover, processor 1012 may receive, via transceiver 1016, an ML measurement response message. The ML measurement response message may indicate QoS measurement information on one or more links within each of one or more transmission paths of a plurality of transmission paths in an ML ESS network with a single-point association.

In some implementations, the ML measurement response message may be received responsive to either the transmitting of the ML measurement request message or a value of a measured parameter exceeding a trigger threshold.

In some implementations, the ML measurement response message may include a service-based transmission path measurement report indicating transmission QoS performance of one or more paths between the non-AP MLD and the ML ESS manager/gateway.

In some implementations, the ML measurement request message may be transmitted to an AP MLD (e.g., apparatus 1020) and the ML measurement response message may be received from the AP MLD. In such cases, the service-based transmission path measurement report may specify a QoS measurement performed on a link of the AP MLD. Alternatively, or additionally, the service-based transmission path measurement report may specify a QoS measurement performed on a path to the ML ESS manager/gateway including a backhaul link between the AP MLD and the ML ESS manager/gateway.

In some implementations, the service-based transmission path measurement report may indicate a service ID and a service ID type. In such cases, the service ID may indicate a QoS service of a single stream or multiple streams on a respective path of the one or more transmission paths. Moreover, the service ID type may indicate a type of QoS service ID. In some implementations, the service ID may identify the QoS characteristics of a single stream or different streams. In some implementations, the service ID type may indicate the type of QoS service ID as one of the following: TID/UP, DSCP, IP port, and SCSID.

In some implementations, the service-based transmission path measurement report may also indicate information related to a measured transmission delay of one or more MSDUs with the QoS characteristic specified by the Service ID. In some implementations, in the measurement report message, the Path ID/Link ID field may be used to indicate the QoS measurement result on the path/link identified by this field. That is, the measurement result may be for a specific path/link or for all paths/links of the measurement report.

In some implementations, the ML measurement request message may include an ML transmission path subelement containing one or more sets of a path ID and link ID (Path ID/Link ID) information field and a service ID type and service ID (Service ID type/Service ID) information field corresponding to the one or more transmission paths.

In some implementations, the Path ID/Link ID information field may identify a path and a link on which a service-based transmission measurement to be performed and reported is requested by the ML measurement request message.

In some implementations, the Path ID/Link ID information field may indicate a path ID identifying an AP MLD affiliated with the ML ESS network. Moreover, the Path ID/Link ID information field may further indicate a link ID identifying an AP affiliated with the AP MLD.

In some implementations, a value in the Path ID/Link ID information field may be set to either a first value or a second value. The first value may indicate that the service-based transmission measurement report includes QoS measurement results on all links of one or more neighboring AP MLDs. The second value may indicate that the service-based transmission measurement report includes QoS measurement results on all links of one or more AP MLDs affiliated with the ML ESS network.

In some implementations, the Service ID type/Service ID information field may identify a type of QoS service ID and a service ID of a QoS service specified by the service ID type.

In some implementations, process 1100 may involve processor 1012 performing additional operations. For instance, process 1100 may involve processor 1012 transmitting, via transceiver 1016, duplicated MSDUs on multiple links or paths based on a QoS profile of a traffic and an ML measurement report in the ML measurement response message. Alternatively, or additionally, process 1100 may involve processor 1012 receiving, via transceiver 1016, other duplicated MSDUs from an ML ESS manager/gateway on multiple links or paths based on the QoS profile of the traffic and one or more ML measurement results.

In some implementations, process 1100 may involve processor 1012 performing additional operations. For instance, process 1100 may involve processor 1012 selecting a transmission path from the plurality of transmission paths based on a QoS profile of a traffic and an ML measurement report in the ML measurement response message. Moreover, process 1100 may involve processor 1012 transmitting, via transceiver 1016, a time-sensitive traffic on the selected transmission path. Furthermore, process 1100 may involve processor 1012 distributing, via transceiver 1016, other traffics among one or more remaining transmission paths of the plurality of transmission paths.

Illustrative Processes

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to service-based transmission path measurement for ML ESS networks in wireless communications in accordance with the present disclosure. Process 1100 may include one or more operations, actions, or functions as illustrated by one or more of blocks 1110, 1120 and 1130. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 1010 and apparatus 1020 as well as any variations thereof. Solely for illustrative purposes and without limiting the scope, process 1100 is described below in the context of apparatus 1010 implemented in or as MLD 110 and apparatus 1020 implemented in or as MLD 120 of a wireless network such as a WLAN in network environment 100 in accordance with one or more of IEEE 802.11 standards. It is noteworthy that, although examples described below are provide in the context of apparatus 1010 implementing a STA affiliated with an NSTR non-AP MLD (e.g., MLD 110) and apparatus 1020 implementing an AP affiliated with an NSTR AP MLD (e.g., MLD 120). It is noteworthy that process 1100 may also be implemented in the context of apparatus 1010 implementing an AP affiliated with a non-AP MLD (e.g., MLD 110) and apparatus 1020 implementing a STA affiliated with an AP MLD (e.g., MLD 120). Process 1100 may begin at block 1110.

At 1110, process 1100 may involve processor 1012 transmitting, via transceiver 1016, an ML measurement request message (e.g., to an ML ESS manager/gateway via apparatus 1020). Process 1100 may proceed from 1110 to 1120.

At 1120, process 1100 may involve processor 1012 receiving, via transceiver 1016, an ML measurement response message. The ML measurement response message may indicate QoS measurement information on one or more links within each of one or more transmission paths of a plurality of transmission paths in an ML ESS network with a single-point association.

In some implementations, the ML measurement response message may be received responsive to either the transmitting of the ML measurement request message or a value of a measured parameter exceeding a trigger threshold.

In some implementations, the ML measurement response message may include a service-based transmission path measurement report indicating transmission QoS performance of one or more paths between the non-AP MLD and an ML ESS manager/gateway.

In some implementations, the ML measurement request message may be transmitted to an AP MLD (e.g., apparatus 1020) and the ML measurement response message may be received from the AP MLD. In such cases, the service-based transmission path measurement report may specify a QoS measurement performed on a link of the AP MLD. Alternatively, or additionally, the service-based transmission path measurement report may specify a QoS measurement performed on a path to the ML ESS manager/gateway including a backhaul link between the AP MLD and the ML ESS manager/gateway.

In some implementations, the service-based transmission path measurement report may indicate a service ID and a service ID type. In such cases, the service ID may indicate a QoS service of a single stream or multiple streams on a respective path of the one or more transmission paths. Moreover, the service ID type may indicate a type of QoS service ID. In some implementations, the service ID may identify the QoS characteristics of a single stream or different streams. In some implementations, the service ID type may indicate the type of QoS service ID as one of the following: TID/UP, DSCP, IP port, and SCSID.

In some implementations, the service-based transmission path measurement report may also indicate information related to a measured transmit delay of one or more MSDUs with the QoS characteristic specified by the Service ID. In some implementations, in the measurement report message, the Path ID/Link ID field may be used to indicate the QoS measurement result on the path/link identified by this field. That is, the measurement result may be for a specific path/link or for all paths/links of the measurement report.

In some implementations, the ML measurement request message may include an ML transmission path subelement containing one or more sets of a path ID and link ID (Path ID/Link ID) information field and a service ID type and service ID (Service ID type/Service ID) information field corresponding to the one or more transmission paths.

In some implementations, the Path ID/Link ID information field may identify a path and a link on which a service-based transmission measurement to be performed and reported is requested by the ML measurement request message.

In some implementations, the Path ID/Link ID information field may indicate a path ID identifying an AP MLD affiliated with the ML ESS network. Moreover, the Path ID/Link ID information field may further indicate a link ID identifying an AP affiliated with the AP MLD.

In some implementations, a value in the Path ID/Link ID information field may be set to either a first value or a second value. The first value may indicate that the service-based transmission measurement report includes QoS measurement results on all links of one or more neighboring AP MLDs. The second value may indicate that the service-based transmission measurement report includes QoS measurement results on all links of one or more AP MLDs affiliated with the ML ESS network.

In some implementations, the Service ID type/Service ID information field may identify a type of QoS service ID and a service ID of a QoS service specified by the service ID type.

In some implementations, process 1100 may involve processor 1012 performing additional operations. For instance, process 1100 may involve processor 1012 transmitting, via transceiver 1016, duplicated MSDUs on multiple links or paths based on a QoS profile of a traffic and an ML measurement report in the ML measurement response message. Alternatively, or additionally, process 1100 may involve processor 1012 receiving, via transceiver 1016, other duplicated MSDUs from an ML ESS manager/gateway on multiple links or paths based on the QoS profile of the traffic and one or more ML measurement results.

In some implementations, process 1100 may involve processor 1012 performing additional operations. For instance, process 1100 may involve processor 1012 selecting a transmission path from the plurality of transmission paths based on a QoS profile of a traffic and an ML measurement report in the ML measurement response message. Moreover, process 1100 may involve processor 1012 transmitting, via transceiver 1016, a time-sensitive traffic on the selected transmission path. Furthermore, process 1100 may involve processor 1012 distributing, via transceiver 1016, other traffics among one or more remaining transmission paths of the plurality of transmission paths.

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to service-based transmission path measurement for ML ESS networks in wireless communications in accordance with the present disclosure. Process 1200 may include one or more operations, actions, or functions as illustrated by block 1210. Process 1200 may be implemented by or in apparatus 1010 and apparatus 1020 as well as any variations thereof. Solely for illustrative purposes and without limiting the scope, process 1200 is described below in the context of apparatus 1010 implemented in or as MLD 110 and apparatus 1020 implemented in or as MLD 120 of a wireless network such as a WLAN in network environment 100 in accordance with one or more of IEEE 802.11 standards. It is noteworthy that, although examples described below are provide in the context of apparatus 1010 implementing a STA affiliated with an NSTR non-AP MLD (e.g., MLD 110) and apparatus 1020 implementing an AP affiliated with an NSTR AP MLD (e.g., MLD 120). It is noteworthy that process 1200 may also be implemented in the context of apparatus 1010 implementing an AP affiliated with a non-AP MLD (e.g., MLD 110) and apparatus 1020 implementing a STA affiliated with an AP MLD (e.g., MLD 120). Process 1200 may begin at block 1210.

At 1210, process 1200 may involve processor 1022 of apparatus 1020 configuring (e.g., as an ML ESS manager/gateway) a single-point association ML ESS network with multiple AP MLDs. At least one of the AP MLDs, containing one or more lower MAC layers and PHY protocol stacks each of which corresponding to an affiliated AP or a corresponding link, may be connected to the ML ESS manager/gateway of the ML ESS network with an upper MAC layer protocol stack.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

transmitting, by a processor of a non-access point (non-AP) multi-link device (MLD), a multi-link (ML) measurement request message; and receiving, by the processor, an ML measurement response message, wherein the ML measurement response message indicates quality of service (QoS) measurement information on one or more links within each of one or more transmission paths of a plurality of transmission paths in an ML enhanced service set (ESS) network with a single-point association, and wherein the ML measurement response message comprises a service-based transmission path measurement report indicating transmission QoS performance of one or more paths between the non-AP MLD and an ML ESS manager/gateway.

2. The method of claim 1, wherein the ML measurement response message is received responsive to either the transmitting of the ML measurement request message or a value of a measured parameter exceeding a trigger threshold.

3. The method of claim 1, wherein the ML measurement request message is transmitted to an access point (AP) MLD and the ML measurement response message is received from the AP MLD, and wherein the service-based transmission path measurement report specifies a QoS measurement performed on a link of the AP MLD.

4. The method of claim 1, wherein the ML measurement request message is transmitted to an access point (AP) MLD and the ML measurement response message is received from the AP MLD, and wherein the service-based transmission path measurement report specifies a QoS measurement performed on a path to the ML ESS manager/gateway including a backhaul link between the AP MLD and the ML ESS manager/gateway.

5. The method of claim 1, wherein the service-based transmission path measurement report indicates a service identifier (ID) and a service ID type, wherein the service ID indicates a QoS service of a single stream or multiple streams on a respective path of the one or more transmission paths, and wherein the service ID type indicates a type of QoS service ID.

6. The method of claim 5, wherein the service ID identifies QoS characteristics of a stream service, and wherein the service ID type indicates the type of QoS service ID as one of:

a traffic identifier (TID) or a user priority (UP);
a Differentiated Service Code Point (DSCP);
an Internet Protocol (IP) port; and
a stream classification service ID (SCSID).

7. The method of claim 1, wherein the service-based transmission path measurement report further indicates information related to a measured transmit delay of one or more medium access control (MAC) service data units (MSDUs) with the QoS characteristics specified by the Service ID.

8. The method of claim 1, wherein the ML measurement request message comprises an ML transmission path sub-element containing one or more sets of a path identifier (ID) and link ID (Path ID/Link ID) information field and a service ID type and service ID (Service ID type/Service ID) information field corresponding to the one or more transmission paths.

9. The method of claim 8, wherein the Path ID/Link ID information field identifies a path and a link on which a service-based transmission measurement to be performed and reported is requested by the ML measurement request message.

10. The method of claim 9, wherein the Path ID/Link ID information field indicates a path ID identifying an access point (AP) MLD affiliated with the ML ESS network, and wherein the Path ID/Link ID information field further indicates a link ID identifying an AP affiliated with the AP MLD.

11. The method of claim 9, wherein a value in the Path ID/Link ID information field is set to either a first value or a second value, wherein the first value indicates that the service-based transmission measurement report includes QoS measurement results on all links of one or more neighboring access point (AP) MLDs, and wherein the second value indicates that the service-based transmission measurement report includes QoS measurement results on all links of one or more AP MLDs affiliated with the ML ESS network.

12. The method of claim 8, wherein the Service ID type/Service ID information field identifies a type of QoS service ID and a service ID of a QoS service specified by the service ID type.

13. The method of claim 1, further comprising:

transmitting, by the processor, duplicated medium access control (MAC) service data units (MSDUs) on multiple links or paths based on a QoS profile of a traffic and an ML measurement report in the ML measurement response message.

14. The method of claim 1, further comprising:

receiving, by the processor, duplicated medium access control (MAC) service data units (MSDUs) from an ML ESS manager/gateway on multiple links or paths based on a QoS profile of a traffic and one or more ML measurement results.

15. The method of claim 1, further comprising:

selecting, by the processor, a transmission path from the plurality of transmission paths based on a QoS profile of a traffic and an ML measurement report in the ML measurement response message;

transmitting, by the processor, a time-sensitive traffic on the selected transmission path; and distributing, by the processor, other traffics among one or more remaining transmission paths of the plurality of transmission paths.

16. A method of service-based transmission path measurement, comprising:

configuring, by a processor of an apparatus, a single-point association multi-link (ML) enhanced service set (ESS) network with multiple access point (AP) multi-link devices (MLDs);

receiving, by the processor, an ML measurement request message; and transmitting, by the processor, an ML measurement response message, wherein one of the AP MLDs, containing one or more lower medium access control (MAC) layers and physical (PHY) protocol stacks each of which corresponding to an affiliated AP or a corresponding link, is connected to an ML ESS manager/gateway of the ML ESS network with an upper MAC layer protocol stack, and wherein the ML measurement response message comprises a service-based transmission path measurement report indicating transmission QoS performance of one or more paths between the non-AP MLD and an ML ESS manager/gateway.

17. An apparatus implementable in a non-access point (non-AP) multi-link device (MLD), comprising:

a transceiver configured to communicate wirelessly; and a processor coupled to the transceiver and configured to perform, via the transceiver, operations comprising:

transmitting a multi-link (ML) measurement request message; and receiving an ML measurement response message, wherein the ML measurement response message indicates quality of service (QoS) measurement information on one or more links within each of one or more transmission paths of a plurality of transmission paths in an ML enhanced service set (ESS) network with a single-point association, and wherein the ML measurement response message comprises a service-based transmission path measurement report indicating transmission QoS performance of one or more paths between the non-AP MLD and an ML ESS manager/gateway.

18. The apparatus of claim 17, wherein the ML measurement response message is received responsive to either the transmitting of the ML measurement request message or a value of a measured parameter exceeding a trigger threshold.

19. The apparatus of claim 17, wherein the ML measurement request message comprises an ML transmission path subelement containing one or more sets of a path identifier (ID) and link ID (Path ID/Link ID) information field and a service ID type and service ID (Service ID type/Service ID) information field corresponding to the one or more transmission paths.

* * * * *